United States Patent [19]

Oleszko et al.

[11] Patent Number: 5,290,089
[45] Date of Patent: Mar. 1, 1994

[54] SEAT BELLOWS ENERGY ABSORBER

[75] Inventors: Mark A. Oleszko, Warren; Kenneth A. Gassman, Waterford; Mladen Humer, East Detroit, all of Mich.

[73] Assignee: General Motors Corporation, Detroit, Mich.

[21] Appl. No.: 997,696

[22] Filed: Dec. 28, 1992

[51] Int. Cl.$^5$ ............................................... B60N 2/42
[52] U.S. Cl. ................................ 297/216.14; 297/216.1
[58] Field of Search .............. 297/216, 472, 355, 354, 297/361, 470, 216.1, 216.13, 216.14, 216.15, 216.16, 354.12, 354.1, 361.1

[56] References Cited

U.S. PATENT DOCUMENTS

| | | | |
|---|---|---|---|
| 3,582,133 | 6/1971 | DeLavenne | 297/216 X |
| 3,724,603 | 4/1973 | Shiomi et al. | 297/216 X |
| 3,838,870 | 10/1974 | Hag | 297/472 |
| 4,733,911 | 3/1988 | Fulcheri | 297/345 X |

FOREIGN PATENT DOCUMENTS

| | | | |
|---|---|---|---|
| 0275230 | 11/1989 | Japan | 297/216 |
| 1039131 | 8/1966 | United Kingdom | 297/216 |

Primary Examiner—Kenneth J. Dorner
Assistant Examiner—Milton Nelson, Jr.
Attorney, Agent, or Firm—Ernest E. Helms

[57] ABSTRACT

A recliner arrangement for a vehicle seat is provided which, in a preferred embodiment, includes a seat cushion unit, a seat backrest unit pivotally connected to the seat cushion unit, a linear recliner for selectively adjusting the pivotal location of the backrest unit, and an energy absorber interposed between the linear recliner and the seat backrest unit, the energy absorber being operative upon a predetermined magnitude of force exerted thereon.

7 Claims, 2 Drawing Sheets

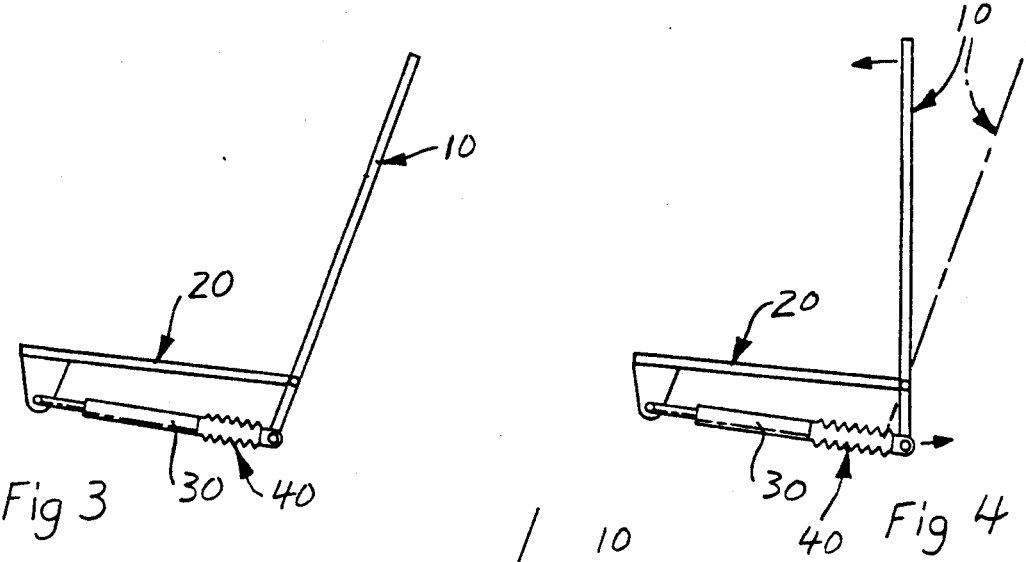
Fig 3
Fig 4
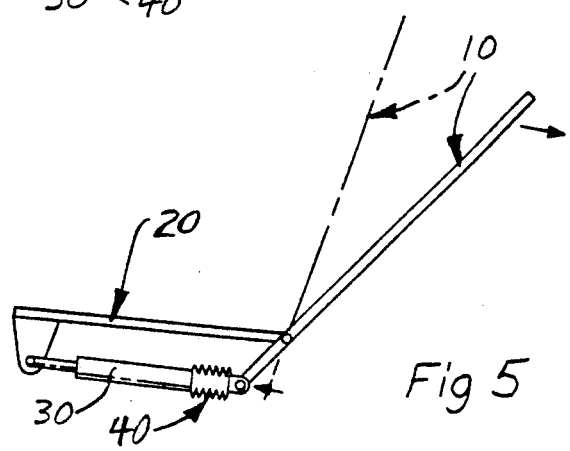
Fig 5
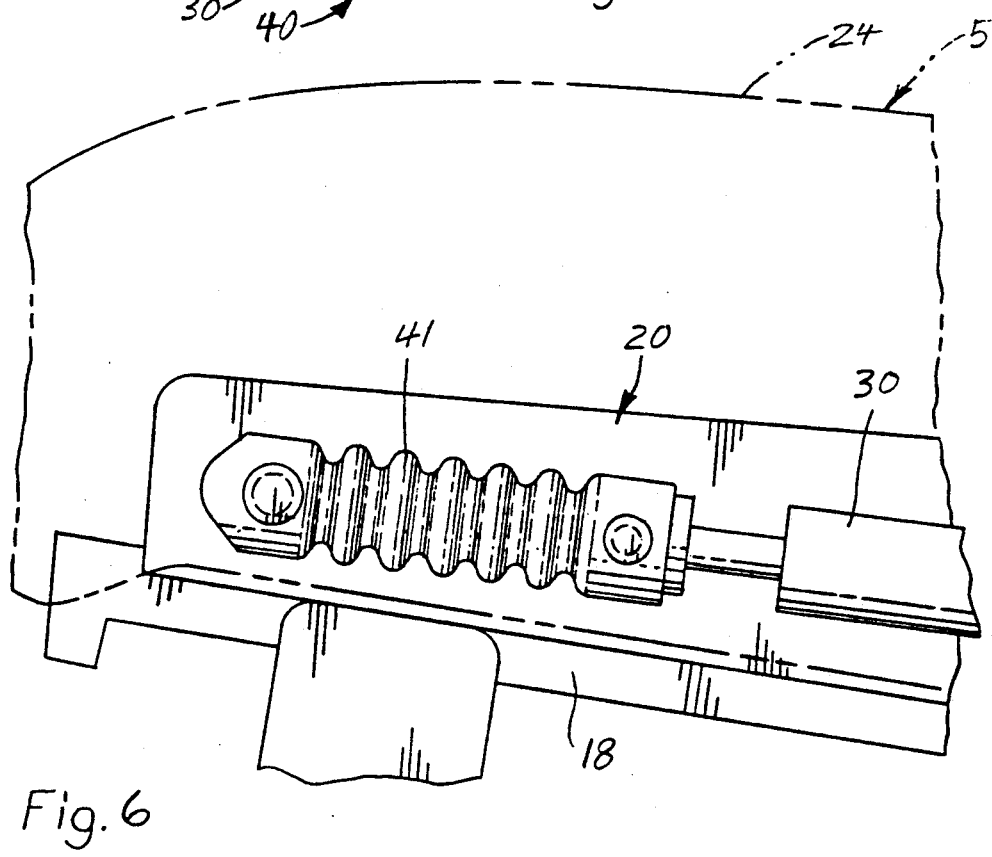
Fig. 6

SEAT BELLOWS ENERGY ABSORBER

BACKGROUND OF THE INVENTION

The present invention generally pertains to a backrest for a vehicle seat and, more particularly, to an adjustable backrest having an energy-absorbing recliner arrangement.

When a vehicle experiences the very rapid accelerations of decelerations of a collision, large forces are imparted to all its components. To protect the occupants of such a vehicle, energy management means are incorporated at appropriate locations throughout the vehicle. To this end, a multitude of seats have been introduced that propose to offer some measure of occupant protection during an impact. Of the various types of crash seats, the most widely accepted are those that absorb energy by plastic deformation of their components. Any deformable features, however, must be balanced with the strength requirements necessary for normal operating conditions and reliability needs. Therefore, a seat should be rigid enough for everyday use, but when an impact load on the seat becomes so great as to exceed a predetermined magnitude, energy management means within the seat should become operative. Such means should dissipate energy by offering a controlled yielding of appropriate seat components.

A vehicle seat arrangement typically comprises a cushion unit and a backrest unit wherein the backrest unit is pivotally mounted to the cushion unit. The pivoting backrest offers several fundamental features, including the ability to be adjustably reclined rearward from an upright position to accommodate occupant comfort. Any number of arrangements are available by which the reclination can be selectively controlled, but the present invention is broadly directed to a class of seats with reclining devices known as linear adjusters.

Linear adjuster are well known and include pneumatic or hydraulic springs, rods with friction clutches or teeth engagingly held, jackscrews or the like. They generally comprise adjustable elongate means having a first end usually mounted on the frame of the cushion unit or seat hardware and a second end usually mounted on the backrest at a selected distance away from the backrest pivot axis. They are further characterized as those arrangements that can accommodate an increase or decrease of the distance between the two selected mounting points that result when the second mounting location rotates with the backrest unit. The adjuster is normally locked to prevent undesired movement of the backrest, but when the adjuster is released, the backrest can be pivoted to a desired position and the adjuster can then again be relocked. During rotation, the adjuster means accommodates the resulting change in the distance between the adjuster's two mounting locations.

The present invention is novel in that it comprises a dedicated energy management device incorporated into a linear adjuster arrangement. The arrangement, unlike most other seat backrest energy management means, is such that it is effective in both front and rear impact modes. In the preferred embodiment, a pneumatic strut has a first end pivotally secured to the seat cushion frame or seat hardware. An energy-absorbing corrugated tube cooperatively couples a second end of the strut and the seat backrest at the second mounting location. During normal operation, the tube acts as a stable extension of the strut, thereby accommodating rotation of the backrest about the pivot axis. However, when forward or rearward impact forces exceed a predetermined magnitude, the tube will stretch or compress accordingly, thereby absorbing energy.

Other seats have shown energy management means for a seat backrest, but each has disadvantages as noted below. For example, the seat in U.S. Pat. No. 3,501,200 presents a deformable support bracket but is applicable only for a fixed backrest. U.S. Pat. No. 3,832,033 has dedicated energy management means that are only applicable for frontal impacts, the means comprising an elastomeric block that stores backrest energy but later returns most of that energy to the backrest upon rebound. The seat shown in U.S. Pat. No. 3,953,068 uses rotational energy management devices that are not applicable for a reclinable seat. Finally, FIG. 6 shown in U.S. Pat. No. 3,734,562 teaches of an energy management system designed only for forward impacts, and that is not applicable for a reclinable seat.

Accordingly, it is a primary object of the present invention to provide an improved linear adjustment arrangement for a reclinable vehicle seat whereby the improvement comprises a deformable energy management device that is effective in both front and rear impact modes. It is a further object to provide an energy management arrangement that is incorporated into existing seat components, thereby requiring little additional space. Another object of the invention is to provide an energy management device that does not degrade the performance or inhibit the operation of the recliner arrangement. These and other objects and advantages of the present invention will be apparent from the detailed description of a preferred embodiment thereof when considered in conjunction with the accompanying drawings.

BRIEF DESCRIPTION OF THE DRAWINGS

FIG. 3 is a schematic view of the seat adjuster arrangement during the rest position.

FIG. 4 is a schematic view of the seat adjuster arrangement during an impact deceleration of the vehicle.

FIG. 5 is a schematic view illustrating the operation of the seat adjuster arrangement during an impact acceleration of the vehicle.

FIG. 6 is an alternative preferred embodiment of the present invention.

DETAILED DESCRIPTION OF A PREFERRED EMBODIMENT

Figure 1:
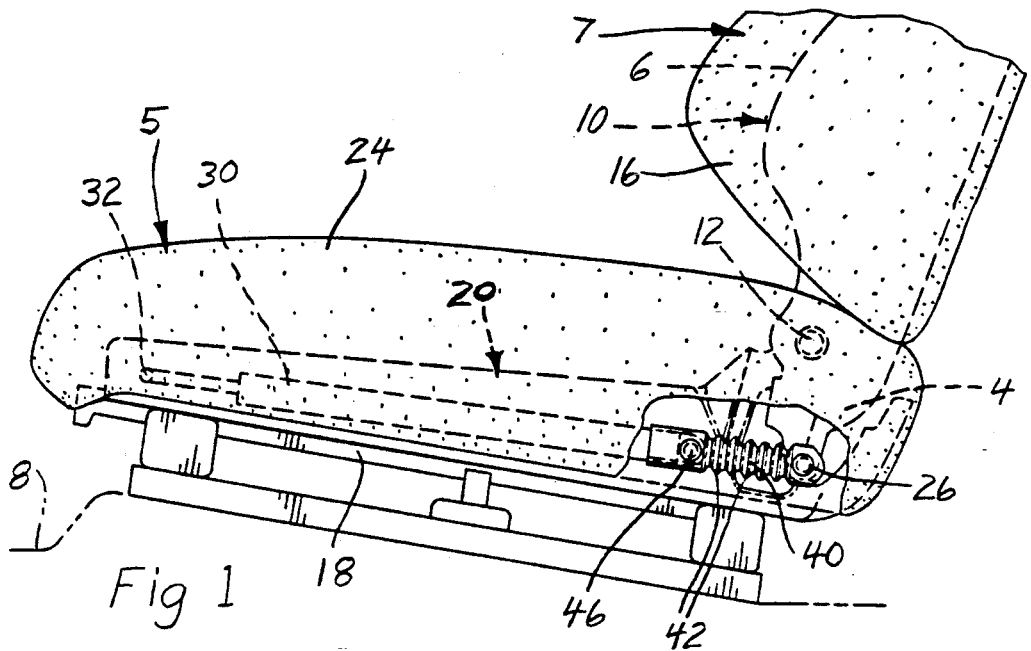
FIG. 1 is a side elevational view of a preferred embodiment recliner seat arrangement according to the present invention.
Figure 2:
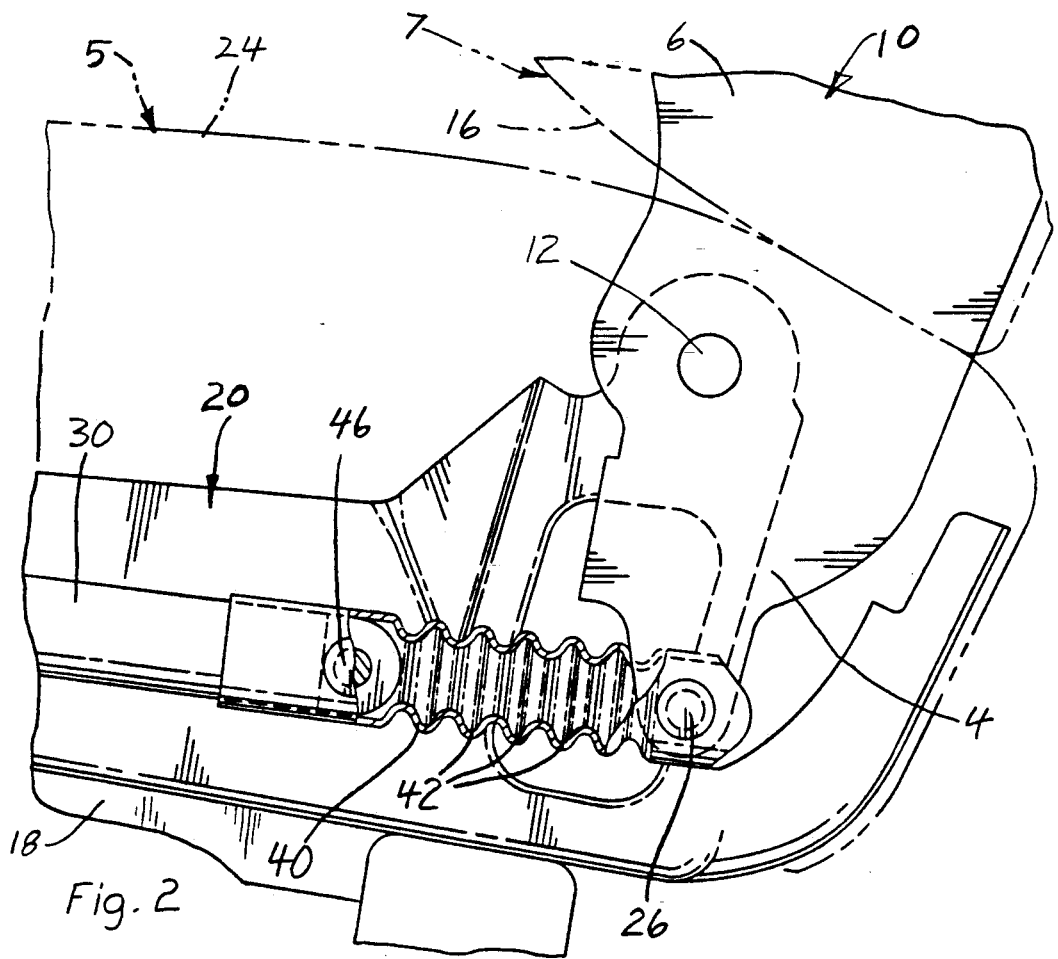
FIG. 2 is an enlarged view of a portion of FIG. 1 with the seat cushion material removed.

Referring mainly to FIGS. 1 and 2, the vehicle seat 5 is connected to the vehicle floor 8 via a fore and aft seat adjuster 18. The vehicle seat and recliner adjuster mechanism has a bun frame 20 which is encased in a polymeric cushion and fabric (or leather or vinyl) cover 24. (Note: As used in the present disclosure, the bun frame 20 also includes seat hardware fixed with respect to the frame 20.) Pivotally connected to the bun frame 20 is a vehicle seat backrest, commonly referred to as a seatback frame 10 having a portion 6 above the pivotal connection 12 and a portion 4 below the same. The vehicle seatback frame 10 is encased with polymeric foam and a fabric covering 16 to form vehicle backrest 7. To provide for adjustably reclining the vehicle backrest 7, there is provided a linear adjuster 30. The linear adjuster may be of several types as that previously described; however, as illustrated, the linear adjuster is a hydraulic with gas assist-type one. Not shown in the drawing is a remote control unit typically on an arm rest or door panel which electrically controls a solenoid valve which selectively connects a bore within the linear actuator 30 with a source of pressurized fluid or a vent to the atmosphere. The actuator 30 would typically be a double-acting hydraulic cylinder with means of an on/off valve to lock the seat adjuster in the desired location it is adjusted to. However, the actuator 30 can additionally be any of the other types of linear actuators previously referred to. Additionally, not shown is a torsional spring which can optionally be utilized to bias the seatback in an upward position if so desired.

In operation, to allow the backrest 7 to recline, the linear actuator 30 will shorten its length, causing the backrest 7 to pivotally move, rotating in a generally clockwise direction. To extend the seat upward, the linear actuator 30 will extend itself, causing the backrest 7 to rotate in a generally counterclockwise direction.

The linear actuator 30 is pivotally connected along a pin 26 with the seatback frame 10 of vehicle backrest 7 via an energy-absorbing unit 40 at one end and connect to bun frame 20 by pin 32 at the other end. The energy absorption unit, aligned with the linear actuator 30, is pinned at one end by a pin 46 to the linear actuator 30 and, as previously mentioned, pivotally attached to the seatback frame 10 via a pin 26. The energy absorption unit has a series of corrugations 42 which in normal operation act in a normal rigid manner.

Referring additionally to FIGS. 3, 4 and 5, in normal operation of adjustment, the energy absorption unit 40 merely is a rigid extension of the linear actuator 30. In situations of a sudden vehicular deceleration beyond that which can be normally expected, the energy absorption unit 40 will yield and plastically deform to absorb the additional energy. As a consequence of this yielding, the seatback frame 10 will have greatly reduced bounce in the rearward direction (the direction opposite to the energy absorption).

In instances where there is a sudden acceleration of the vehicle beyond that which can be typically imposed on the vehicle by its engine, the energy absorption unit 40 will plastically deform in compression. In like manner, as previously described, seatback frame 10 will have greatly diminished bounceback in the forward direction. Again, the seatback frame 10 will not bounce back as in many other prior arrangements.

FIG. 6 illustrates an alternative embodiment of the present invention where an energy absorption unit 41, aligned with the linear actuator 30, is connected between the linear actuator 30 and the bun seat frame 20.

Although details of a preferred embodiment have been specified above, they are only intended to illustrate and not limit the present invention. Various modifications of adaptations thereof are possible and will be readily identified by persons skilled in the art. However, such changes are intended to fully reside within the spirit and scope of the claimed present invention.

The embodiments of the invention in which an exclusive property or privilege is claimed are defined as follows:

1. A recliner arrangement for a vehicle seat comprising:
   a seat cushion unit;
   a seat backrest unit;
   means for pivotally connecting the backrest unit to the cushion unit for rotational motion between an upright and reclined position;
   linear recliner means for selectively adjusting the pivotal location of the backrest unit about the pivot means; and
   plastically deformable energy-absorbing means aligned with the linear recliner means and interposed between the linear recliner means and the seat backrest unit, the energy-absorbing means being operative upon a predetermined magnitude of force exerted thereon.

2. A recliner arrangement as defined in claim 1 wherein the energy-absorbing means is operative in tensile and compressive modes when the backrest experiences respective forward forces in excess of predetermined magnitudes and rearward forces in excess of predetermined magnitudes.

3. The recliner arrangement as defined in claim 2 wherein said energy-absorbing means comprises a corrugated tube.

4. A recliner arrangement for a vehicle seat comprising:
   a seat cushion unit;
   a seat backrest unit;
   means for pivotally connecting the backrest unit to the cushion unit for pivotal motion between an upright and reclined position;
   linear recliner means for selectively adjusting the pivotal location of the backrest unit about the pivot means; and
   plastically deformable energy-absorbing means aligned with the linear recliner means and interposed between the cushion unit and the linear recliner means, the energy-absorbing means being operative upon a predetermined magnitude of force exerted thereon.

5. A recliner arrangement as defined in claim 4 wherein the energy-absorbing means is operative in tensile and compressive modes when the backrest experiences respective forward forces in excess of predetermined magnitudes and rearward forces in excess of predetermined magnitudes.

6. The recliner arrangement as defined in claim 5 wherein the energy-absorbing means comprises a corrugated tube.

7. A recliner arrangement for a vehicle seat comprising:
   a seat cushion unit;
   a seat backrest unit;
   means for pivotally connecting the backrest unit to the cushion unit such that the backrest can be selectively pivotally moved between an upright position and a rearward reclined position;
   extensible and compressible linear-actuated recliner means for selectively adjusting the rearward pivotal location of the backrest unit about the pivot means, the recliner means having a forward end secured to the seat cushion unit and the recliner means having releasable locking means for both initiating and limiting operation of the recliner means, and
   plastically deformable energy-absorbing means aligned with the recliner means and cooperatively interposed between the recliner means and the backrest unit, the energy-absorbing means being operative in tensile and compressive modes when the backrest experiences respective forward dynamic loading forces that are in excess of predetermined magnitudes and rearward dynamic loading forces that are in excess of predetermined magnitudes.

* * * * *